(12) United States Patent
Kimura et al.

(10) Patent No.: US 6,455,667 B1
(45) Date of Patent: Sep. 24, 2002

(54) METHOD FOR MANUFACTURING POLYCARBONATE

(75) Inventors: Takato Kimura, Ichihara; Takayoshi Anamizu, Chiba; Satoru Minami; Tomoaki Shimoda, both of Ichihara, all of (JP)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/455,194

(22) Filed: Dec. 6, 1999

(30) Foreign Application Priority Data

Dec. 18, 1998 (JP) ............................................. 10-361357

(51) Int. Cl.⁷ .................................................. C08F 6/00
(52) U.S. Cl. ........................ 528/480; 528/196; 528/198

(58) Field of Search .................................. 528/196, 198, 528/480

(56) References Cited

FOREIGN PATENT DOCUMENTS

| EP | 0 708 130 A | 4/1996 |
| EP | 1 020 483 A | 7/2000 |

OTHER PUBLICATIONS

European Search Report for Application No. EP 00 30 4169.

Primary Examiner—Terressa M. Boykin

(57) ABSTRACT

The present invention provides a method for manufacturing polycarbonate with excellent dwell stability (e.g., thermal stability and hue stability) during melting and molding, as well as with a low content of impurities. The present invention further relates to a method for manufacturing polycarbonate wherein the molten polycarbonate is filtered through a passivation treated metal filter.

11 Claims, No Drawings

METHOD FOR MANUFACTURING POLYCARBONATE

BACKGROUND OF THE INVENTION

The present application is a U.S. non-provisional application based upon and claiming priority from Japanese Application No. HEI 10-361357, which is hereby incorporated by reference.

The present invention relates to a method for manufacturing polycarbonate characterized by excellent dwell stability (e.g., thermal stability and hue stability) during melting as well as by a low content of impurities.

Polycarbonates have excellent mechanical properties such as impact resistance as well as other outstanding qualities such as heat resistance and transparency. They are widely used in a number of products, including mechanical components, optical disks, and automobile parts. In particular, a great deal of research interest has focused on the use of polycarbonate for production of a variety of optical products, such as memory disks, fibers, and lenses.

Commercially available methods for manufacturing polycarbonate include direct reaction of a bisphenol compound such as bisphenol A with phosgene (interfacial method) or a melt polycondensation reaction of a bisphenol compound such as bisphenol A with a carbonate diester compound such as a diphenyl carbonate (ester interchange reaction).

Of the above methods, the interfacial method utilizing phosgene is generally used in industry. However, melt polycondensation methods of manufacturing polycarbonate are advantageous because they are less costly than interfacial methods, and moreover, the polycarbonate can be manufactured without using phosgene, the latter which is a highly toxic substance.

Polycarbonate manufactured for use in optical devices such as memory disks must contain only minimal quantities of impurities and foreign matter and have excellent color tone and transparency characteristics. It is for this reason that during the production of polycarbonate, a filtering process with a metal filter is used while the polycarbonate is melted in order to remove any foreign matter. However, filtering of molten polycarbonate with conventional metal filters, especially when the absolute filter precision of the filter is small and the filtering dwell time is long, can produce degradation and coloring of the polycarbonate. In addition, metal impurities such as Fe ions from the metal filter may be incorporated into the final product. This ultimately results in reduced thermal and hue stability of the polycarbonate during melting and molding. Aromatic polycarbonates obtained by melt polycondensation of a bisphenol with a carbonate diester often contain many highly reactive terminal hydroxy groups. When these types of polycarbonates are filtered through conventional metal filters, metal ions from the metal filter can react with the terminal hydroxyl groups, rendering the polycarbonate product more prone to degradation and coloring.

The inventors of the present invention considered these various problems, and as a result of their diligent efforts, they invented a method for manufacturing polycarbonate that exhibit excellent thermal and hue stability during melting and molding. This is achieved by filtering the polycarbonate melt through a passivation treated metal filter in order to remove foreign matter in a highly efficient manner.

The object of the present invention is based on the above principles in order to provide a method for manufacturing polycarbonate characterized by excellent dwell stability (e.g., thermal and hue stability) during melting and molding as well as by a low content of impurities.

BRIEF SUMMARY OF THE INVENTION

The method for manufacturing polycarbonate related to the present invention is characterized by filtering of the polycarbonate melt through a passivation treated metal-filter.

Immediately before filtering the polycarbonate using the passivation treated metal filter, the metal filter should be washed with a weakly acidic organic compound.

This weakly acidic organic compound should be an aromatic hydroxy compound, preferably a phenol.

When filtering the polycarbonate, the metal filter should be preheated to the working temperature in a nitrogen atmosphere.

The polycarbonate filtered through the passivation treated metal filter should contain 50 ppb or less of metal impurities.

The absolute filter precision of the metal filter should be 50 μm or less.

DETAILED DESCRIPTION OF THE INVENTION

The following sections describe in further detail the method for manufacturing polycarbonate related to the present invention.

The method for manufacturing polycarbonate related to the present invention is characterized by filtering of the polycarbonate melt through a passivation treated metal filter.

The method for manufacturing polycarbonate related to the present invention may generally be used in conjunction with known interfacial methods or ester interchange reactions for the production of polycarbonates from bisphenols. This invention is particularly effective when polycarbonates are manufactured by melt polycondensation of a bisphenol with a carbonate diester (ester interchange reaction), which results in the presence of many highly reactive terminal hydroxyl groups.

The following is a detailed explanation of the present invention as it relates to polycarbonate obtained by an ester interchange reaction.

Melt Polycondensation of Polycarbonate

The polycarbonates ideally suited for application of the manufacturing method in the present invention are polycarbonates obtained by melt polycondensation of a bisphenol according to formula [I] with a carbonate diester in the presence of an alkali catalyst.

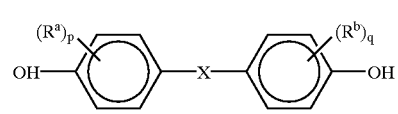

[I]

In formula [I], $R^a$ and $R^b$ represent halogen atoms and/or monovalent hydrocarbon groups, and they may be the same or different. The "p" and "q" represent integers from 0 to 4.

The X represents

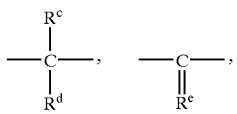

wherein $R^c$ and $R^d$ represent hydrogen atoms and/or monovalent hydrocarbon groups, and $R^c$ and $R^d$ may form a cyclic structure. R represents a divalent hydrocarbon group.

The bisphenol compounds represented by formula [I] above may include bis(hydroxyaryl) alkanes such as:
1,1-bis(4-hydroxyphenyl) methane,
1,1-bis(4-hydroxyphenyl) ethane,
2,2-bis(4-hydroxyphenyl) propane (bisphenol A),
2,2-bis(4-hydroxyphenyl) butane,
2,2-bis(4-hydroxyphenyl) octane,
1,1-bis(4-hydroxyphenyl) propane,
1,1-bis(4-hydroxyphenyl) n-butane,
bis(4-hydroxyphenyl) phenylmethane,
2,2-bis(4-hydroxy-1-methylphenyl) propane,
1,1-bis(4-hydroxy-t-butylphenyl) propane,
and 2,2-bis(4-hydroxy-3-bromophenyl) propane;
as well as bis(hydroxyaryl) cycloalkanes such as:
1,1-bis(4-hydroxyphenyl) cyclopentane
and 1,1-bis(4-hydroxyphenyl) cyclohexane In the bisphenol compound represented by the above formula, the X may also represent —O—, —S—, —SO—, or —SO$_2$—, for example,
a bis(hydroxyaryl) ether such as:
4,-4'-dihydroxydiphenyl ether
and 4,-4'-dihydroxy-3,3'-dimethylphenyl [sic] ether;
a bis(hydroxydiaryl) sulfide such as:
4,-4'-dihydroxydiphenyl sulfide
and 4,-4'-dihydroxy-3,3'-dimethyldiphenyl sulfide;
a bis(hydroxydiaryl) sulfoxide such as:
4,4'-dihydroxydiphenyl sulfoxide
and 4,-4'-dihydroxy-3,3'-dimethyldiphenyl sulfoxide;
or a bis(hydroxydiaryl) sulfone such as:
5 4,-4'-dihydroxydiphenyl sulfone and 4,4'-dihydroxy-3,3'-dimethyldiphenyl sulfone.

Chemical formula (II) also represents a type of bisphenol compound that may be used in the present invention.

[II]

In the above formula, $R^f$ represents a halogen atom, a hydrocarbon group containing 1 to 10 carbon atoms, or a halogen substituted hydrocarbon group. The "n" represents an integer from 0 to 4. If n is 2 or greater, the $R^f$ groups may be the same or different.

The bisphenol compounds represented by formula (II) above may include resorcinol and substituted resorcinols such as:
3-methyl resorcinol; 3-ethyl resorcinol, 3-propyl resorcinol, 3-butyl resorcinol, 3-t-butyl resorcinol, 3-phenyl resorcinol, 3-cumyl resorcinol, 2,3,4,6-tetrafluroresorcinol, and 2,3,4,6-tetrabromoresorcinol; catechol;
and hydroquinone and substituted hydroquinones such as:
3-methyl hydroquinone; 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetraflurohydroquinone, and 2,3,4,6-tetrabromohydroquinone.

Bisphenol compounds represented by the structural formula below may also be used, for example: 2,2,2',2'-tetrahydro-3,3,3'-3'-tetramethyl-1,1'-spirobi- [1H-indene]-6,6'-diol

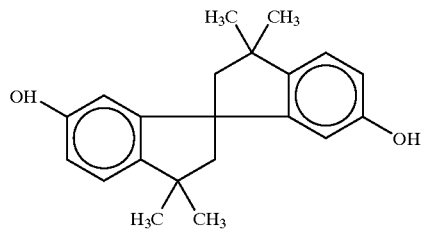

Among the above bisphenol compounds, those represented by formula [I] should preferably be used in the present invention, especially bisphenol A.

Specific carbonate diester compounds that may be used in this invention include: diphenyl carbonate, ditolyl carbonate, bis(chlorophenyl) carbonate, m-cresyl carbonate, dinapthyl carbonate, bis(diphenyl) carbonate, diethyl carbonate, dimethyl carbonate, dibutyl carbonate, and dicyclohexyl carbonate.

Two or more of these carbonate diester compounds may also be used. Among the above carbonate diester compounds, diphenyl carbonate should preferably be used in the present invention.

The carbonate diester compound used may also contain dicarboxylic acids or dicarboxylate esters. Specifically, the carbonate diester used should contain no more than 50 mole %, and preferably no more than 30 mole %, of dicarboxylic acids or dicarboxylate esters.

Specific examples of these dicarboxylic acids and dicarboxylate esters include: aromatic dicarboxylic acids and dicarboxylate esters such as terephthalic acid, isophthalic acid, diphenyl terephthalate, and diphenyl isophthalate; aliphatic dicarboxylic acids and dicarboxylate esters such as succinic acid, glutaric acid, adipic acid, pimelic acid, suberic acid, azelaic acid, sebacic acid, decanedioic acid, dodecanedioic acid, diphenyl sebacate, diphenyl decanedioate, and diphenyl dodecanedioate; and alicyclic dicarboxylic acids and dicarboxylate esters such as cyclopropane dicarboxylic acid, 1,2-cyclobutane dicarboxylic acid, 1,3-cyclobutane dicarboxylic acid, 1,2-cyclopentane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, diphenylcyclopropane dicarboxylate, diphenyl-1,2-cyclobutane dicarboxylate, diphenyl-1,3-cyclobutane dicarboxylate, diphenyl-1,2-cyclopentane dicarboxylate, diphenyl-1,3-cyclopentane dicarboxylate, diphenyl-1,2-cyclohexane dicarboxylate, diphenyl-1,3-cyclohexane dicarboxylate, and diphenyl-1,4-cyclohexane dicarboxylate.

The carbonate diester used may also contain 2 or more of these dicarboxylic acids and/or dicarboxylate esters.

For the carbonate diester and bisphenol compounds used in the present invention, 1.00 to 1.30 moles, and preferably 1.01 to 1.20 moles, of the carbonate diester should be added per 1 mole of the bisphenol compound.

The mixture of the carbonate diester and bisphenol compounds may also contain a melt polycondensation catalyst.

The melt polycondensation catalyst used is generally an (a) alkali metal compound and/or an alkaline earth compound (hereinafter referred to as "(a) alkali (earth) metal compound").

The (a) alkali (earth) metal compound used should preferably be an organic acid salt, inorganic acid salt, oxide, hydroxide, hydride, or an alcoholate of an alkali metal or alkaline earth metal.

Specific alkali metal compounds that may be used include: sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium phenylborate, sodium benzoate, potassium benzoate, lithium benzoate, disodium hydrogen phosphate, dipotassium hydrogen phosphate, dilithium hydrogen phosphate; disodium, dipotassium, and dilithium salts of bisphenol A; and sodium, potassium, and lithium salts of phenols.

Specific alkaline earth metals that may be used include: calcium hydroxide, barium hydroxide, magnesium hydroxide, strontium hydroxide, calcium hydrogencarbonate, barium hydrogencarbonate, magnesium hydrogencarbonate, strontium hydrogen-carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Two or more of the above mentioned compounds may also be used.

The amount of alkali (earth) metal compound present in the melt polycondensation reaction mixture should be $1 \times 10^{-8}$ to $1 \times 10^{-3}$ mole, preferably be $1 \times 10^{-7}$ to $2 \times 10^{-6}$ mole, and more preferably be $1 \times 10^{-7}$ to $8 \times 10^{-7}$ mole, per 1 mole of the bisphenol compound. When the alkali (earth) metal compound is present beforehand in the bisphenol used as a starting material for the melt polycondensation reaction, the amount of alkali (earth) metal compound per 1 mole of bisphenol during the melt polycondensation reaction should be adjusted accordingly within the above ranges.

A (b) basic compound may also be added to the (a) alkali (earth) metal compound used as the melt polycondensation catalyst.

Suitable (b) basic compounds include, for example, nitrogen containing compounds that decompose readily and that are volatile at high temperature. Specific examples of such compounds are given below.

These compounds include: ammonium hydroxide compounds containing alkyl and aryl groups such as tetramethylammonium hydroxide ($Me_4NOH$), tetraethylammonium hydroxide ($Et_4NOH$), tetrabutylammonium hydroxide ($Bu_4NOH$), and trimethylbenzyl-ammonium hydroxide ($\phi\text{-}CH_2(Me)_3NOH$); tertiary amines such as trimethylamine, triethylamine, dimethylbenzylamine, and triphenylamine; secondary amines represented by the formula $R_2NH$ (in the formula, R may represent an alkyl group such as methyl or ethyl, or an aryl group such as phenyl or tolyl); primary amines represented by the formula $RNH_2$ (in the formula, R may represent the same groups described immediately above); pyridines such as 4-dimethylaminopyridine, 4-diethylaminopyridine, and 4-pyrrolidinopyridine; imidazoles such as 2-methylimidazole and 2-phenylimidazole; or ammonia and other basic salts such as tetramethylammonium borohydride ($Me_4NBH_4$), tetrabutylammonium borohydride ($Bu_4NBH_4$), tetrabutylammonium tetraphenylborate ($Bu_4NBPh_4$), and tetramethylammonium tetraphenylborate ($Me_4NBPh_4$).

Among the above mentioned basic compounds, the use of tetraalkylammonium hydroxides is preferable.

The amount of these (b) nitrogen containing basic compounds should be $1 \times 10^{-6}$ to $1 \times 10^{-1}$ mole, and preferably be $1 \times 10^{-5}$ to $1 \times 10^{-2}$ mole, per 1 mole of the bisphenol compound.

Boric acid compounds (c) may also be used as the catalyst. Examples of these (c) boric acid compounds include boric acid and borate esters.

Suitable borate esters include the borate esters represented by the general formula shown below.

$$B(OR)_n(OH)_{3-n}$$

In the formula, R represents an alkyl group such as methyl or ethyl, or an aryl group such as phenyl. The "n" represents 1, 2, or 3.

Specific examples of these borate esters include: trimethyl borate, triethyl borate, tributyl borate, trihexyl borate, triheptyl borate, triphenyl borate, tritolyl borate, and trinapthyl borate.

The amount of these (c) boric acid or borate ester compounds should be $1 \times 10^{-8}$ to $1 \times 10^{-1}$ mole, preferably be $1 \times 10^{-7}$ to $1 \times 10^{-2}$ mole, and more preferably be $1 \times 10^{-6}$ to $1 \times 10^{-4}$ mole, per 1 mole of the bisphenol compound.

As the melt polycondensation catalyst, the (a) alkali (earth) metal compound and (b) nitrogen containing basic compound can be combined, or the (a) alkali (earth) metal compound, the (b) nitrogen containing basic compound, and the (c) boric acid or borate ester compound can be combined.

The catalyst, when the (a) alkali (earth) metal compound and (b) nitrogen containing basic compound are combined in the above mentioned quantities, enables the polycondensation reaction to proceed at a sufficient rate, with formation of high molecular weight polycarbonates at a high rate of polymerization activity.

When the combination of (a) alkali (earth) metal compound and (b) nitrogen containing basic compound is used, or when the combination of (a) alkali (earth) metal compound, (b) nitrogen containing basic compound, and (c) boric acid or borate ester is used as the catalyst, a mixture of these catalyst constituents may be added to the melted mixture of the bisphenol and carbonate diester compounds, or these catalyst constituents may be added separately to the melted mixture of the bisphenol and carbonate diester compounds.

The above mentioned bisphenol and carbonate diester compounds are reacted by melt polycondensation in the presence of the above mentioned melt polycondensation catalyst. Impurities and other particulate matter may be removed beforehand from the bisphenol and carbonate diester mixture by means of a fluorinated resin membrane filter.

The polycondensation reaction of the bisphenol and carbonate diester can be carried out under similar conditions for conventional polycondensation reactions. For example, the reaction can be carried out in 2 or more stages.

Specifically, the first stage of the reaction of the bisphenol with the carbonate diester should be carried out at a temperature of 80 to 250° C., preferably at 100 to 230° C., and more preferably at 120 to 190° C. The reaction time should be 0.01 to 5 hours, preferably be 0.01 to 4 hours, and more preferably be 0.01 to 3 hours, at atmospheric pressure. Next, the bisphenol and carbonate diester should be further reacted while reducing the pressure and increasing the temperature of the reaction system. Finally, the polycondensation reaction of the bisphenol and carbonate diester should be carried out at a pressure no greater than 5 mm Hg, and preferably no greater than 1 mm Hg, at a temperature of 240 to 320° C.

The above polycondensation reaction can be carried out as a continuous or batch type process. The reaction vessel may be a drum, tube, or tower.

In addition to the bisphenol and carbonate diester compounds used to manufacture the polycarbonate, polyfunctional compounds containing 3 or more functional groups per molecule can also be used. Compounds with phenolic hydroxyl groups or carboxyl groups are preferable, in particular, compounds containing 3 phenolic hydroxyl groups. Specific examples of these polyfunctional compounds include: 1,1,1 -tris(4-hydroxyphenyl) ethane, 2,2', 2"-tris(4-hydroxyphenyl) diisopropylbenzene, α-methyl-α, α', α'-tris(4-hydroxyphenyl) -1,4-diethylbenzene, α, α', α"-tris(4-hydroxyphenyl)-1,3,5-triisopropylbenzene, phloroglucinol, 4,6-dimethyl-2,4,6-tri(4-hydroxyphenyl)-heptane-2 [sic], 1,3,5-tri(4-hydroxyphenyl) benzene, 2,2-bis-[4,4-(4,4'-dihydroxyphenyl)-cyclo-hexyl]propane, trimellitic acid, 1,3,5-benzenetricarboxylic acid, and pyromellitic acid.

Among the above polyfunctional compounds, 1,1,1 -tris (4-hydroxyphenyl) ethane and α, α', α"-tris(4-hydroxyphenyl)-1,3,5- triisopropylbenzene are preferable.

The amount of the above polyfunctional compounds should be no greater than 0.03 mole, preferably be 0.001 to 0.02 mole, and more preferably be 0.001 to 0.01 mole, per 1 mole of the bisphenol compound.

In addition to the aromatic dihydroxy compound and carbonate diester used to manufacture the polycarbonate, a terminal agent may also be used.

An aryloxy compound, as shown in the general formula (III) below, which can be introduced as an end group on the end of the polycarbonate molecules, can be used as a suitable terminal agent.

ArO—                                    [III]

In the above formula, Ar represents an aromatic hydrocarbon group containing 6 to 50 carbon atoms. There is no particular restriction on the type of aromatic hydrocarbon group. A phenyl, naphthyl, or condensed ring such as an anthranyl group is suitable. In addition, the aromatic ring may form other rings with saturated hydrocarbons and/or heteroatoms. These aromatic rings may also be substituted by halogen atoms and alkyl groups containing from 1 to 9 carbon atoms.

Specific examples of these aryloxy compounds include: phenol, diphenyl carbonate, p-tert-butyl phenol, p-tert-butylphenyl phenylcarbonate, p-tert-butylphenyl carbonate, p-cumyl phenol, p-cumylphenyl phenylcarbonate, and p-cumylphenyl carbonate; and chroman compounds such as 2,2,4-trimethyl4-(4hydroxyphenyi) chroman, 2,2,4,6-tetramethyl4-(3,5-dimethyl-4-hydroxyphenyl) chroman, 2,2,3-trimethyl-3-(4-hydroxy-1 5 phenyl) chroman, 2,2,3,6-tetramethyl-3-(3,5-dimethyl-4-hydroxyphenyl) chroman, 2,4,4-trimethyl-2-(2-hydroxyphenyl) chroman, and 2,4,4,6-tetramethyl-2-(3,5-dimethyl-2-hydroxyphenyl) chroman.

One or a combination of the above mentioned aryloxy compounds may be used.

The amount of aryloxy compounds should be 0.01 to 0.2 mole, preferably be 0.02 to 0.15 mole, and more preferably be 0.02 to 0.1 mole, per 1 mole of the aromatic dihydroxy compound.

Use of the above amounts of aryloxy compounds as the terminal agent should terminate 1 to 95%, preferably 10 to 95%, and more preferably 20 to 90%, of the ends of the polycarbonate molecules with end groups represented above by the general formula (III).

Polycarbonates in which end groups such as those represented by the general formula (III) have been introduced in the above ratios exhibit excellent heat resistance, and moreover, they have excellent mechanical characteristics such as impact resistance, even at low molecular weights.

In addition to the above types of aryloxy compounds as terminal agents, aliphatic monocarboxy compounds represented by the following general formula (IV), which can be introduced as aliphatic hydrocarbon units, may be used as needed.

[IV]

In the above formula, R represents an alkyl group containing 10 to 30 carbon atoms. This may be linear, branched, or halogen substituted.

Specific examples of these aliphatic monocarboxy compounds include: alkyl monocarboxylic acids such as undecanoic acid, lauric acid, tridecanoic acid, pentadecanoic acid, palmitic acid, heptadecanoic acid, stearic acid, nonadecanoic acid, heneicosanoic acid, tricosanoic acid, and melissic acid; and alkyl monocarboxylate esters (e.g., methyl esters, ethyl esters, and phenyl esters of the above monocarboxylic acids) such as methyl stearate, ethyl stearate, and phenyl stearate.

One or a combination of more than one of the above compounds may be used. The amount of these aliphatic monocarboxy compounds should be 0.01 to 0.20 mole, preferably be 0.02 to 0.15 mole, and more preferably be 0.02 to 0.10 mole, per 1 mole of the aromatic dihydroxy compound.

If the total amount of the above types of terminal agents exceeds 0.2 mole per 1 mole of the aromatic dihydroxy compound, the rate of polymerization may be reduced.

The intrinsic viscosity, in methylene chloride at 20° C., of the reaction products (polycarbonate) obtained in the above manner should be 0.10 to 1.0 dl/g, and preferably be 0.30 to 0.65 dl/g.

The melt flow rate for the reaction products (polycarbonate) should be 1 to 70 g/10 min, and preferably be 2 to 50 g/10 min, for the high viscosity product when measured at a temperature of 300° C. and load of 1.2 kg; and should be 5 to 20 g/10 min, and preferably be 8 to 16 g/10 min, for the low viscosity product when measured at a temperature of 250° C. and load of 1.2 kg.

For the polycarbonate used in the present invention, the reaction products obtained in the above manner do not have to be cooled. Instead, sulfur containing acid compounds with a pKa of 3 or less and/or derivatives formed from these acid compounds (including the acid compounds listed below) may be added.

Examples of these sulfur containing acid compounds and derivatives of these acid compounds include sulfurous acid, sulfuric acid, sulfinic acid compounds, sulfonic acid compounds, and their derivatives.

For example, specific sulfurous acid derivatives include dimethyl sulfite, diethyl sulfite, dipropyl sulfite, dibutyl sulfite, and diphenyl sulfite.

Specific examples of sulfuric acid derivatives include dimethyl sulfate, diethyl sulfate, dipropyl sulfate, dibutyl sulfate, and diphenyl sulfate.

Specific examples of sulfinic acid compounds include benzenesulfinic acid, toluene-sulfinic acid, and naphthalenesulfinic acid.

Sulfonic acid compounds and their derivatives that may be used include those compounds and their ammonium salts as represented by general formula (V) below.

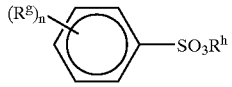

[V]

In the above formula, $R^g$ represents a hydrocarbon group or halogen substituted hydrocarbon group containing 1 to 50 carbon atoms. $R^h$ represents a hydrogen atom or a hydrocarbon group or halogen substituted hydrocarbon group containing 1 to 50 carbon atoms. The "n" represents an integer from 0 to 3.

Two or more of the above compounds may also be used.

Among the above acid compounds, sulfonic acid compounds represented by general formula (V) and their derivatives are preferable.

For the polycarbonate (A) in the present invention, the above types of acid compounds should be present in a ratio of 0.1 to 4.5 ppm, and preferably in a ratio of 0.2 to 3 ppm, of the reaction product.

Blending the above specified amounts of acid compounds with the reaction product (polycarbonate) will neutralize or weaken any residual alkali metal compound from the catalyst, resulting in improved dwell stability and moisture resistance of the final polycarbonate product.

Water may also be added in addition to the above mentioned acid compounds. The ratio of water to the reaction product (polycarbonate) should be 5 to 1000 ppm, preferably 10 to 500 ppm, and more preferably 20 to 300

Kneading of the reaction product with the acid compound can be performed by conventional methods using a single screw extruder, twin screw extruder, or static mixer. Kneaders with or without vents may be effectively used for blending. More specifically, the acid compound and water may be added to the melted polycondensation reaction product in the reaction vessel or extruder.

Filter Treatment

The present invention involves filtering of the melted polycarbonate, manufactured as described above, through a passivation treated metal filter.

Most commercially available metal filters for industrial use can be used for the filtering process in the present invention. Specific examples include candle filters, pleat type filters, and leaf disk filters. Among these types, leaf disk metal filters are preferable because of low retention and channeling of the polymer melt.

These metal filters can be made from any metal material that is not prone to corrosion or abrasion. Such commercially available metals include stainless steel, Hastelloy (trade name), nickel stainless steels, and other nickel alloys.

The filter precision of the metal filter used in the present invention may vary depending on the size and amount of particulate matter in the manufactured polycarbonate as well as on the filter pressure drop. In general, it should be 50 $\mu$m or less, and preferably 10 $\mu$m or less.

In the present invention, filtering may be effectively carried out beforehand of the bisphenol and carbonate diester as starting materials or at the low molecular weight oligomer stage. This can reduce the exchange frequency of filters used for filtering the melted polymer. The filters used for this filtering process can include readily available flat, cylinder, or candle type filters. The absolute filter precision of these filters should be 20 $\mu$m or less, and preferably 5 $\mu$m or less. The use of filters with an absolute filter precision exceeding 20 $\mu$m may ultimately result in more clogging by the polycarbonate reaction product.

The metal filter used in the present invention should be passivation treated in order to prevent dissolving of metal ions into the polycarbonate due to corrosion or degradation at the time of use. Passivation involves oxide coating of the metal surface to form a stable protective layer and minimize reactivity of the metal with environmental factors. Methods of passivating stainless steel include (1) immersion of the metal in a solution of a passivating agent containing nitric acid or another strong acid, or spraying of the metal with such a solution, (2) low temperature heating of the metal in oxygen or purified air, and (3) anodic protection of the metal in a solution containing an oxidizing agent. Method (1) is most commonly used.

Passivation treatment as described above can reduce coloring due to metal ions from the metal filter,. thus enabling the production of polycarbonates with excellent hue stability and heat resistance.

The effects of this passivation treatment can be confirmed by saline spray or corrosion potential methods. A more convenient method is by use of a ferro-check reagent (Nishiyama Stainless Chemical Ltd).

In the present invention, the passivation treated metal filter should be washed in a weakly acid organic compound prior to using it for filtering of the polycarbonate. Examples of suitable weakly acidic organic compounds include aromatic hydroxy compounds, and in particular, phenols. Washing with a phenol can be performed with melted phenol by heating to a temperature of 80 to 100° C. This process can minimize any resin coloring that may occur immediately after filter use.

In the present invention, the metal filter should also be heated to the filtering process temperature in a nitrogen atmosphere prior to use. The temperature of the filtering process will vary with the melting temperatures of the manufactured polycarbonate, but should generally be within a range of 290 to 350° C. Preheating the metal filter to the filtering process temperature will reduce any sudden pressure losses and filter deformation, thus enabling efficient filtering of the reaction product.

The metal filter may become clogged after use, with reduced efficiency for collection of foreign matter. However, regeneration of the filter can restore function and allow reuse. Specific methods of filter regeneration include heating to 400 to 500° C., acid cleaning with an acidic agent, and ultrasonic cleaning. Regeneration of the metal filter is carried out to increase the differential pressure of the filter.

The amount of metal impurities present in the polycarbonate filtered through the passivation treated metal filter should be 50 ppb or less, and preferably be 10 ppb or less.

Various additives (E) may also be blended as needed with the polycarbonate before or after filtration with the passivation treated metal filter.

Specific examples of these additives (E) include heat stabilizers, epoxy compounds, ultraviolet absorbers, mold release agents, coloring agents, antistatic agents, slipping agents, anti-blocking agents, lubricants, anti-fogging agents, natural oils, synthetic oils, waxes, organic fillers, and inorganic fillers.

In the method of manufacturing polycarbonate related to the present invention, the reaction product (polycarbonate) is filtered through a passivation treated metal filter, so incorporation of metal impurities such as Fe ions from the metal filter into the final product are reduced. The filter retention times of these polycarbonates produced by melt polycondensation can be shortened, thus reducing degradation and coloring of the final product.

Effects of the Invention

The present invention enables highly efficient manufacturing of polycarbonate with excellent dwell stability (e.g., thermal and hue stability) during melting, and with a low content of foreign matter. Polycarbonate manufactured in this manner is ideal, for example, as sheets of construction materials, as automobile headlight lenses, as optical lenses in glasses, and for optical recording material such as optical disks.

WORKING EXAMPLES

The following section explains the present invention in further detail by means of working examples. However, this invention is not limited to these working examples.

The MFR, initial hue (initial YI value), and dwell hue (dwell YI value) of polycarbon-ate manufactured in working examples of the present invention were measured as described below.

MFR

The MFR was measured in accordance with JIS K-7210, at a temperature of 250° C. and load of 1.2 kg.

Initial Hue

A 3-mm injection molded plate was prepared from the polycarbonate (cylinder temperature, 290° C.; injection pressure, 1000 kg/cm; 1 cycle, 45 sec; mold temperature, 100° C.). A color and color difference meter (ND-1001 DP, Nihon Denshoku Kogyo) was then used to measure X, Y, and Z values by a transmittance method. The yellow index (YI) was calculated by the following formula.

$$YI=100(1.277-1.060Z)/Y$$

Dwell Hue

A 3-mm injection molded plate was prepared from the polycarbonate after residing for 15 minutes in a cylinder at 290° C. (cylinder temperature, 290° C.; injection pressure, 1000 kg/cm; 1 cycle, 45 sec; mold temperature, 100° C.). A color and color difference meter (ND-1001 DP, Nihon Denshoku Kogyo) was then used to measure X, Y, and Z values by a transmittance method. The yellow index (YI) was calculated by the following formula.

$$YI=100(1.277-1.060Z)/Y$$

Working Example 1

Polycarbonate Polymerization

The apparatus used for polycarbonate polymerization included one agitator vessel to mix the starting materials, two prepolymerization vessels, two horizontal polymerization vessels, and one twin-screw extruder. A leaf disk filter (stainless steel; absolute filter precision, 10 $\mu$m; Nihon Pall) was installed in the twin-screw extruder. Before installation, the metal filter was passivation treated with a passivating agent (AD Passive #300S, Nishiyama Stainless Chemical). After installation, the filter was preheated to its working temperature in a stream of nitrogen.

The following table depicts each of the reaction conditions.

TABLE 1

|  | Pressure (torr) | Temperature (° C.) | Mean Dwell Time (hr) |
|---|---|---|---|
| Agitator vessel | Atmospheric pressure (nitrogen atmosphere) | 160 | 2 |
| Prepolymerization vessel A | 100 | 230 | 1 |
| Prepolymerization vessel B | 20 | 240 | 0.5 |
| Horizontal agitator-polymerization vessel A | 3 to 5 | 270 | 0.5 |
| Horizontal agitator-polymerization vessel B | 0.1 to 1.0 | 275 | 0.5 |

The molten bisphenol A (supply rate, 36.0 kg/hr) and the molten diphenyl carbonate delivered from a pipe directly after distillation (supply rate, 34.7 kg/hr) were continuously supplied to the agitator vessel maintained at the above specified temperature used for mixing the starting materials. The catalyst, 0.11 mole of tetramethylammonium hydroxide ($2.5 \times 10^{-4}$ mole/mole of bisphenol A) and 0.00044 mole of sodium hydroxide ($1.0 \times 10^{-6}$ mole/mole of bisphenol A), was then added. This was prepared as a homogeneous mixture.

Next, the prepared homogeneous mixture was continuously supplied to the prepolymerization and horizontal agitator-polymerization vessels at the above specified conditions for polycarbonate polycondensation. The MFR was measured every 2 hours, and the pressures in horizontal agitator-polymerization vessels A and B were adjusted in order to maintain as closely as possible the target MFR (11.0 g/10 min). Phosphite esters, as stabilizing agents, and glycidyl monostearate, as a mold release agent, were added and kneaded in the twin-screw extruder. This mixture was filtered through the passivation treated metal filter and then pelletized.

Table 2 shows the initial YI value and dwell YI value for the polycarbonate obtained in the above manner.

Working Example 2

Polycarbonate was manufactured in the same manner as in Working Example 1, except that the metal filter was not washed in phenol, as in Working Example 1, after passivation treatment.

The results are shown in Table 2.

Comparative Example 1

Polycarbonate was manufactured in the same manner as in Working Example 1, except that the metal filter used was not passivation treated.

These results are also shown in Table 2.

TABLE 2

| | Metal Filter Treatment | | | |
|---|---|---|---|---|
| | Passivation Treated | Phenol Wash | Initial Yl | Dwell Yl |
| Working Example 1 | Yes | Yes | 0.90 | 0.95 |
| Working Example 2 | Yes | No | 0.95 | 1.12 |
| Comparison Example 1 | No | No | 1.13 | 1.52 |

What is claimed is:

1. A method for manufacturing polycarbonate, comprising filtering a polycarbonate melt through a passivation treated metal filter.

2. The method for manufacturing polycarbonate described in claim 1, further comprising washing the passivation treated metal filter with a weakly acidic organic compound before the filtering.

3. The method for manufacturing polycarbonate described in claim 2, wherein the weakly acidic organic compound is an aromatic hydroxy compound.

4. The method for manufacturing polycarbonate described in claim 3, wherein the weakly acidic organic compound is a phenol.

5. The method for manufacturing polycarbonate described in claim 1, further comprising preheating the passivation treated metal filter in a nitrogen atmosphere before the filtering.

6. The method for manufacturing polycarbonate described in claim 1, wherein metal impurities in the polycarbonate filtered through the passivation treated metal filter are 50 ppb or less.

7. The method for manufacturing polycarbonate described in claim 1, wherein the absolute filter precision of the metal filter is 50 $\mu$m or less.

8. The method for manufacturing polycarbonate described in claim 1, wherein the polycarbonate is obtained by melt polycondensation of a bisphenol with a carbonate diester.

9. The method for manufacturing polycarbonate described in claim 8, wherein the bisphenol is bisphenol A.

10. The method for manufacturing polycarbonate described in claim 1, further comprising passivating a metal filter by contacting the metal filter with a passivating agent containing a strong acid; heating the metal filter in an oxidizing atmosphere; and performing an anodic protection of the metal filter in a solution containing an oxidizing agent.

11. The method for manufacturing polycarbonate described in claim 10, wherein the strong acid includes nitric acid.

* * * * *